United States Patent
Abramov et al.

(10) Patent No.: US 9,187,267 B2
(45) Date of Patent: Nov. 17, 2015

(54) METHOD FOR THE VACUUM-PNEUMATIC TRANSPORTING OF BULK MATERIALS WITH A HIGH MASS CONCENTRATION

(71) Applicant: ZAKRYTOE AKCIONERNOE OBSCHESTVO "TWIN TRADING COMPANY", Moscow (RU)

(72) Inventors: Yakov Kuzmich Abramov, Moscow (RU); Vladimir Mihailovich Veselov, Moscow (RU); Viktor Mihailovich Zalevsky, Moscow (RU); Vitaly Grigorievich Tamurka, Moscow (RU); Veniamin Sergeevich Volodin, Vidnoye (RU); Nikolay Aleksandrovich Gukasov, Moscow (RU); Nikolay Vladimirovich Dvoryaninov, Lubertsy (RU)

(73) Assignee: "TWIN TECHNOLOGY COMPANY"(OOO), Moscow (RU)

( * ) Notice: Subject to any disclaimer, the term of this patent is extended or adjusted under 35 U.S.C. 154(b) by 0 days.

(21) Appl. No.: 14/422,690

(22) PCT Filed: Aug. 22, 2013

(86) PCT No.: PCT/RU2013/000735
§ 371 (c)(1),
(2) Date: Feb. 19, 2015

(87) PCT Pub. No.: WO2014/035293
PCT Pub. Date: Mar. 6, 2014

(65) Prior Publication Data
US 2015/0232286 A1    Aug. 20, 2015

(30) Foreign Application Priority Data

Aug. 27, 2012 (RU) ................ 2012136492

(51) Int. Cl.
*B65G 53/66* (2006.01)
*B65G 53/26* (2006.01)

(52) U.S. Cl.
CPC ..................... *B65G 53/26* (2013.01)

(58) Field of Classification Search
USPC .............. 406/50, 85, 151, 152, 153, 173, 197
See application file for complete search history.

(56) References Cited

U.S. PATENT DOCUMENTS 3,832,005 A * 8/1974 Hek ............................... 406/172
4,005,908 A * 2/1977 Freeman ......................... 406/25

(Continued)

FOREIGN PATENT DOCUMENTS

| EP | 0743268 | 11/1996 |
|----|---------|---------|
| RU | 373931  | 3/1973  |

(Continued)

*Primary Examiner* — Joseph Dillon, Jr.
(74) *Attorney, Agent, or Firm* — Yefim Kreydin

(57) ABSTRACT

Invention refers to the pneumatic transport field, namely to vacuum-pneumatic transportation of bulk materials of high mass concentrations.

Summary of the invention consist in that the material delivering from zone under atmospheric pressure into zone under vacuum is performed, at that vacuum is created by alternate action of vacuum impulses from one of two or more vacuum receivers connected to continuous vacuum source in such a way that under vacuum impulse action from one of receivers it synchronically, for the vacuum action duration period, disconnects from continuous vacuum source and the following receiver connects to continuous vacuum source.

Invention allows transporting the bulk material of high concentrations through pipelines of long distances and having the sections of changeable transportation directions (vertical, slope.)

4 Claims, 1 Drawing Sheet

(56) References Cited

U.S. PATENT DOCUMENTS

| | | | |
|---|---|---|---|
| 4,019,641 A * | 4/1977 | Merz | 406/116 |
| 4,221,510 A * | 9/1980 | Smith | 406/118 |
| 4,261,672 A * | 4/1981 | Marbach | 406/50 |
| 4,422,833 A * | 12/1983 | Miller et al. | 417/183 |
| 4,466,760 A * | 8/1984 | Feldsted | 406/41 |
| 4,659,262 A * | 4/1987 | van Aalst | 406/29 |
| 4,701,080 A * | 10/1987 | van Aalst | 406/109 |
| 4,952,099 A * | 8/1990 | Drobadenko et al. | 406/50 |
| 5,021,149 A * | 6/1991 | Geisseler | 209/141 |
| 5,776,217 A * | 7/1998 | Thiele | 55/417 |
| 5,865,568 A * | 2/1999 | Relin et al. | 406/85 |
| 6,257,804 B1 * | 7/2001 | Gathmann | 406/68 |
| 6,688,345 B1 * | 2/2004 | Iglesias et al. | 141/256 |
| 8,113,745 B2 * | 2/2012 | Aoki | 406/197 |
| 8,147,169 B1 * | 4/2012 | Kvalheim | 406/109 |
| 2010/0034599 A1 * | 2/2010 | Snowdon | 406/12 |
| 2010/0212589 A1 * | 8/2010 | Mauchle et al. | 118/694 |
| 2011/0211919 A1 * | 9/2011 | Rasner | 406/14 |
| 2011/0284027 A1 * | 11/2011 | Logan et al. | 134/10 |
| 2014/0348597 A1 * | 11/2014 | Moretto | 406/31 |

FOREIGN PATENT DOCUMENTS

| | | |
|---|---|---|
| RU | 2083456 | 7/1997 |
| SU | 1449486 | 3/1989 |
| SU | 1463664 | 7/1989 |

* cited by examiner

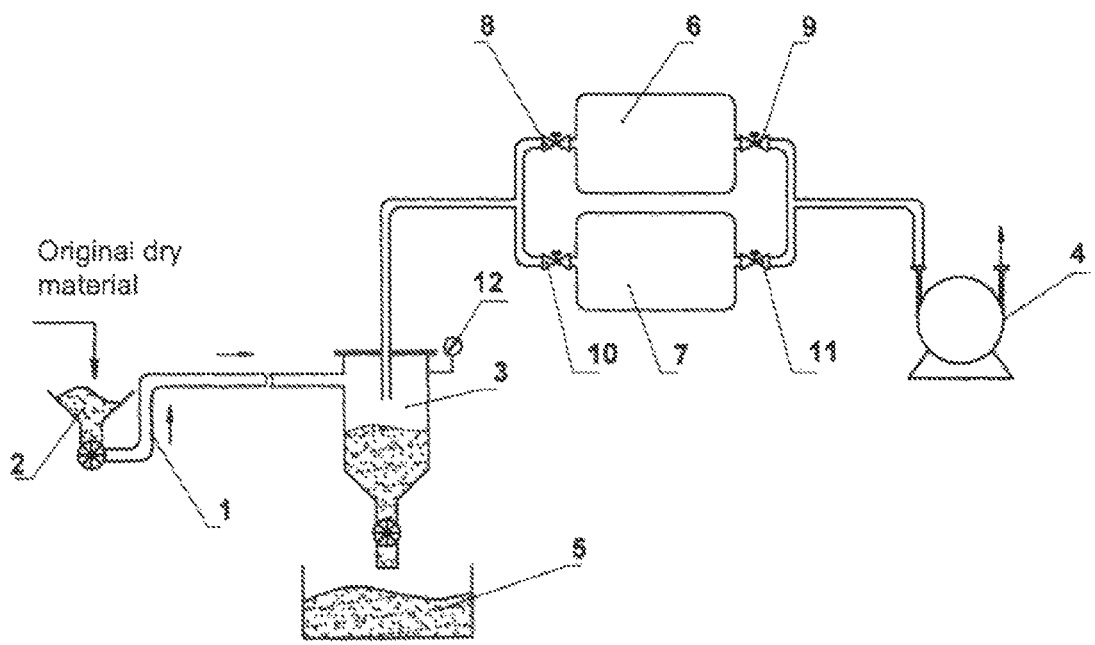

METHOD FOR THE VACUUM-PNEUMATIC TRANSPORTING OF BULK MATERIALS WITH A HIGH MASS CONCENTRATION

This application is the United States national phase application of International Application PCT/RU2013/000735 filed Aug. 22, 2013, which claims the benefit of Russian Patent application No RU 2012136432 Filed Aug. 27, 2012, the entire disclosure of which is incorporated herein by reference.

BACKGROUND AND SUMMARY OF THE INVENTION

Invention relates to the field of aspirating vacuum-pneumatic transportation of bulk materials transported through pipelines under low speed and high concentrations, characterized by mass concentration coefficient from 40 to 100. Alternatively such a transport is called as dense layer vacuum transport (DLVT). The invention can be used in various fields of engineering where it is necessary to intensify the processes of bulk material transportation or perform some technological processes simultaneously with dense layer vacuum transportation. All known methods of dense layer vacuum transportation are realized due to the difference between atmospheric pressure in a place of start of moving of bulk materials through a transport pipeline and rarefication value in a place of stop of transporting of bulk materials. Effective aspiration, low power consumption in case of significant distance of transportation distinguish the dense layer vacuum transport from a large part of known methods of pneumatic transportation of bulk materials in dense layer, operations of which is based on the use of compressed air power. These methods are power-consuming, performed under the pressures much higher than atmospheric one, require compressor equipment and characterized by high speeds from 10 m/s and more, which result in dust entraining and crush of materials.

A method of pneumatic vacuum transportation of bulk materials is known (inventor's certificate USSR No 373931, MTTK B65G53/25 d/d Dec. 11, 1973), according to which prior to being delivered into a transport pipeline the bulk material is exposed to gas aeration in bottom-up direction through a porous partition.

This method disadvantage is that for bulk material aeration a system is required to be fed with compressed air, which increase the vacuum pump power consumption and speed thereof and decrease the bulk material mass concentration as well. These features do not satisfy the conditions for continuous transportation of bulk material of high mass concentration.

The closest by number of similar features to the proposed method (closest analogue) is a method for vacuum-pneumatic transportation of bulk materials (Patent RF No 2083456, MTTK B65G 53/14 d/d Oct. 7, 1997), as per which the transportation of bulk materials of high concentrations in dense layer is supported that the bulk material is vibro-fluidized in a charging device, provided that vibration acceleration value must be equal to or more than gravity acceleration. That method solved the problem of formation of bulk material dense layer on a horizontal section of transporting pipeline of short length by vibro-fluidizing method.

That method disadvantage was that due to attenuation of vibrations while bulk material distancing from inlet section, the vibro-fluidizing becomes not sufficient to support the high concentration of bulk material particles over pipeline cross-section, especially while horizontal transporting. In bulk material flow, distancing from vibro-fluidizing zone, a layering occurs and some areas of particles concentration equal to their bulk condition occur, which results in bulk material breakdowns and air breakthroughs over them, the transporter operation is broken, transportation distance and efficiency are limited.

To support the vibro-fluidizing in a transporting pipeline having vertical, slope, horizontal, and curvilinear sections, and a corresponding number of vibrators is required. This increases additional power consumption, and for routings of several changes of transportation directions it makes impossible the use of vibro-fluidizing because a combination of several vibrators, vibrating in different direction in the same pipeline is enough problematic.

Engineering problem of claimed invention consists in increase of transportation distance of bulk materials of high mass concentrations in case of low power consumption.

Engineering problem to solve is achieved that in method of vacuum-pneumatic transportation of bulk materials of high mass concentrations wherein bulk material is transported through a transporting pipeline from original zone of atmospheric pressure into intake zone, which is under vacuum, and according to the invention, vacuum in intake zone is created by alternate actions of impulses from one of two or more vacuum receivers, each of which is connected to a continuous vacuum source in such a manner that while vacuum impulse acting from one of the receivers on intake zone, this receiver synchronically, for the vacuum action duration period, disconnects from continuous vacuum source and the following receiver connects to continuous vacuum source. Number of receivers is determined by pipeline length and the directions of different sections thereof.

Proposed combination of features of claimed invention will allow ensuring the transportation of bulk material particles of high mass concentrations and low speeds through long length sections including ones containing elements, which change the transportation direction while simultaneous lowering of power consumption.

This is achieved by ensuring of stable support of required mass concentration over pipeline cross-section, because it allows performing fluidization of bulk material along some sections of pipeline avoiding break-downs. Impact of vacuum impulses on intake zone air forms pressure drop front, which spreads along all transportation channel and supports the bulk material in fluidized state of homogeneous concentrations over channel cross-section, compensating the loss of particles speeds and ensuring the transportation through long length pipeline sections. Periodical repetition of this action will allow ensuring the continuity of transportation process.

Drawing (see FIG. 1) explains summary of the invention, which shows principle diagram of vacuum-pneumatic transporting pipeline including elements required to realize proposed method.

DETAILED DESCRIPTION OF THE EXEMPLARY EMBODIMENTS

Vacuum-pneumatic transporting pipeline consists of transporting pipeline (1), original zone in the form of bulk material hopper equipped with feeder (2), bulk material intake zone in the form of cyclone-discharger (3), continuous vacuum source in the form of vacuum pump (4), bulk material collecting vessel (5), two vacuum receivers (6, 7) (either two or more receivers, not shown in the FIGURE), high-speed solenoid operated valves (8, 9, 10, 11), and pressure transmitter in cyclone-discharger (12).

Operation of vacuum-pneumatic transporting pipeline is performed as follows:

Turning on of vacuum pump (4) is performed when valves (8) and (10) are closed and valves (9) and (11) are open. Upon pressure in receivers reaching pre-set pressure value, synchronously with opening of valve (10), valve (11) is closed. As a result in original zone (3) and transporting pipeline (1) the vacuum in created of pressure, sufficient to start transportation. Bulk material under atmospheric pressure is delivered into transporting pipeline (1), in which due to pressure difference obtained between original zone (2) and cyclone-discharger of intake zone (3) a flow of atmosphere air moves, simultaneously fluidizing and entraining bulk material particles, which in the start of transportation have a mass concentration close to bulk concentration. While bulk material particles moving through transporting pipeline channel, their speeds increase under simultaneous decreasing of mass concentrations. Moving of bulk material starting in the start section of transporting pipeline due to action of pressure-decrease front, created by vacuum receiver impulse, is characterized by high and homogeneous mass concentration of bulk material over transporting pipeline cross-section, close to bulk concentration. Under further transporting of bulk material from original zone to vertical, slope, or horizontal directions speed losses of particles increases due to their frictions on channel walls and impacts, gradual slowing of particles occurs up to slowing-down of bulk material layers in bottom, mostly in a horizontal channel. Movement, started as uniformed in concentration, can be broken due to redistribution of concentration over cross-section and settling of particles in wall-adjacent area of transporting pipeline.

In cyclone-discharger of intake zone (3) air flow is separated from bulk material and through open valve (10) is delivered into receiver (7). Pressure value in cyclone-discharger of intake zone (3) increases up to a value, under which the above-mentioned failures of transportation occur and a necessity to perform additional impulse action on transported bulk material arises. The following opening of valves (8) and (11) and synchronous closing of valves (9) and (10) are performed upon reaching a specified value of pressure in intake zone, characteristic of slowing and settling of bulk material particles within transporting pipeline. Impulsive pressure drop in intake zone after opening of valve 8 results in that the expansion of pressure drop front along the channel to the direction of original zone, taking place with sonic speed, ensures the fluidization of bulk material part, slowing down due to friction and head loss.

Passing of pressure drop front of vacuum-impulse action of such high speed through the channel also results in additional increase of speed component of particles, directed to intake zone. To support the process of continuous transportation of bulk material by alternate connections of receivers (6) and (7) to cyclone-discharger of intake zone (3) is performed by open or close of valves (8, 11) and (9, 10).

Time, for which slowing-down of bulk material, accompanied with pressure build up in cyclone-discharger of intake zone and dehomogenization of mass concentration over cross-section after start of bulk material transportation, in its duration is commeasurable with the time of vacuum-impulse action. While transporting the bulk material of high mass concentration the losses, resulted from friction, decrease sharply, which gives the opportunity to increase the transportation distance under constant capacity of vacuum pump. To obtain the maximum effect of impact of pressure drop front, the drift diameters of valves (8, 9, 10, 11) and pipes, which connect these valves to vacuum receivers and intake zone must be not less than the diameter of transporting pipeline channel and their length must be minimal taking into account the dimensions of receivers and volume of intake zone.

Therefore, alternate action of vacuum impulse front on bulk material allow realizing its transportation of high concentration in vertical, slope, and horizontal sections to considerable distance under minimal power consumption.

The invention claimed is:

1. A method of vacuum-pneumatic transportation of bulk materials of high mass concentration comprising
    pneumatically transporting the bulk material through a transporting pipeline from an original zone with atmospheric pressure into a receiving zone,
    creating a vacuum in the receiving zone
    maintaining a stable concentration in mass in the transporting pipeline by fluidization materials wherein
    vacuum in the receiving zone is created by alternate actions of impulses from at least two vacuum receiver, wherein
    each of said at least two receivers is connected to a continuous vacuum source connected by pipes with quick-acting valves to the receiving zone in such a manner that while a vacuum impulse is acting from one of the receivers on the receiving zone,
    each of the said at least two receivers synchronously disconnects from continuous vacuum source during the time of the vacuum impulses and another of said at least two receivers is connecting to the continuous vacuum source.

2. The method of claim 1 wherein the number of receivers is determined by length of the transporting pipeline and directions of individual sections of the transporting pipeline changing a direction of bulk material transporting.

3. The method of claim 2 wherein the vacuum impulse is performed at diameters of flow section of the quick-acting valves and diameters connecting pipes of not less than a bore diameter of the transporting pipeline.

4. The method of claim 1 wherein the vacuum impulse is performed at diameters of flow section of the quick-acting valves and diameters connecting pipes of not less than a bore diameter of the transporting pipeline.

* * * * *